United States Patent [19]

Dias et al.

[11] 4,221,689
[45] Sep. 9, 1980

[54] METHOD OF PRODUCING RESIN SOLUTION AND A SUSPENSION OF PARTICLES THEREIN FOR USE AS A STARTING MATERIAL FOR THE MANUFACTURE OF A COATED FILLER POWDER FOR MAKING MOLDS AND THE LIKE

[75] Inventors: Francisco J. Dias, Jülich; Hartmut Luhleich, Düren, both of Fed. Rep. of Germany

[73] Assignee: Kernforschungsanlage Jülich Gesellschaft mit Beschränkter Haftung, Jülich, Fed. Rep. of Germany

[21] Appl. No.: 950,720

[22] Filed: Oct. 12, 1978

[30] Foreign Application Priority Data

Oct. 13, 1977 [DE] Fed. Rep. of Germany ....... 2746020

[51] Int. Cl.³ .............................................. C08L 61/10
[52] U.S. Cl. .............................. 260/29.3; 106/308 M; 260/38
[58] Field of Search ................. 260/29.3, 38; 528/137, 528/144; 106/308 M

[56] References Cited

U.S. PATENT DOCUMENTS

| | | | |
|---|---|---|---|
| 3,106,540 | 10/1963 | Freedman | 260/29.3 |
| 3,709,849 | 1/1973 | Herbert et al. | 260/29.3 |
| 4,023,979 | 5/1977 | Luhleich | 106/284 |

Primary Examiner—Theodore E. Pertilla
Attorney, Agent, or Firm—Frishauf, Holtz, Goodman & Woodward

[57] ABSTRACT

A suspension of novolac resin is first produced by dissolving phenol in an aqueous formaldehyde solution and the addition of an acid catalyst, followed by heating and refluxing. The hot novolac suspension is diluted with water and then converted into a solution by the addition of alkali hydroxide solution bringing the pH value to the range from 10 to 13. While the solution is still hot, particles of some form of carbon are suspended therein by mixing, vibration, or other agitation and the suspension is fed at 60° C. into acidulated water of a temperature of about 50° C., with the flow of acidulated water and suspension adjusted for a volume ratio of, respectively, 8:1. The resin is thereby precipitated on the surface of the particles and the particles are filtered, washed, and dried to produce a material made up of fine grains, evenly coated with binder, which are useful for making graphitic molds for casting metal.

9 Claims, 1 Drawing Figure

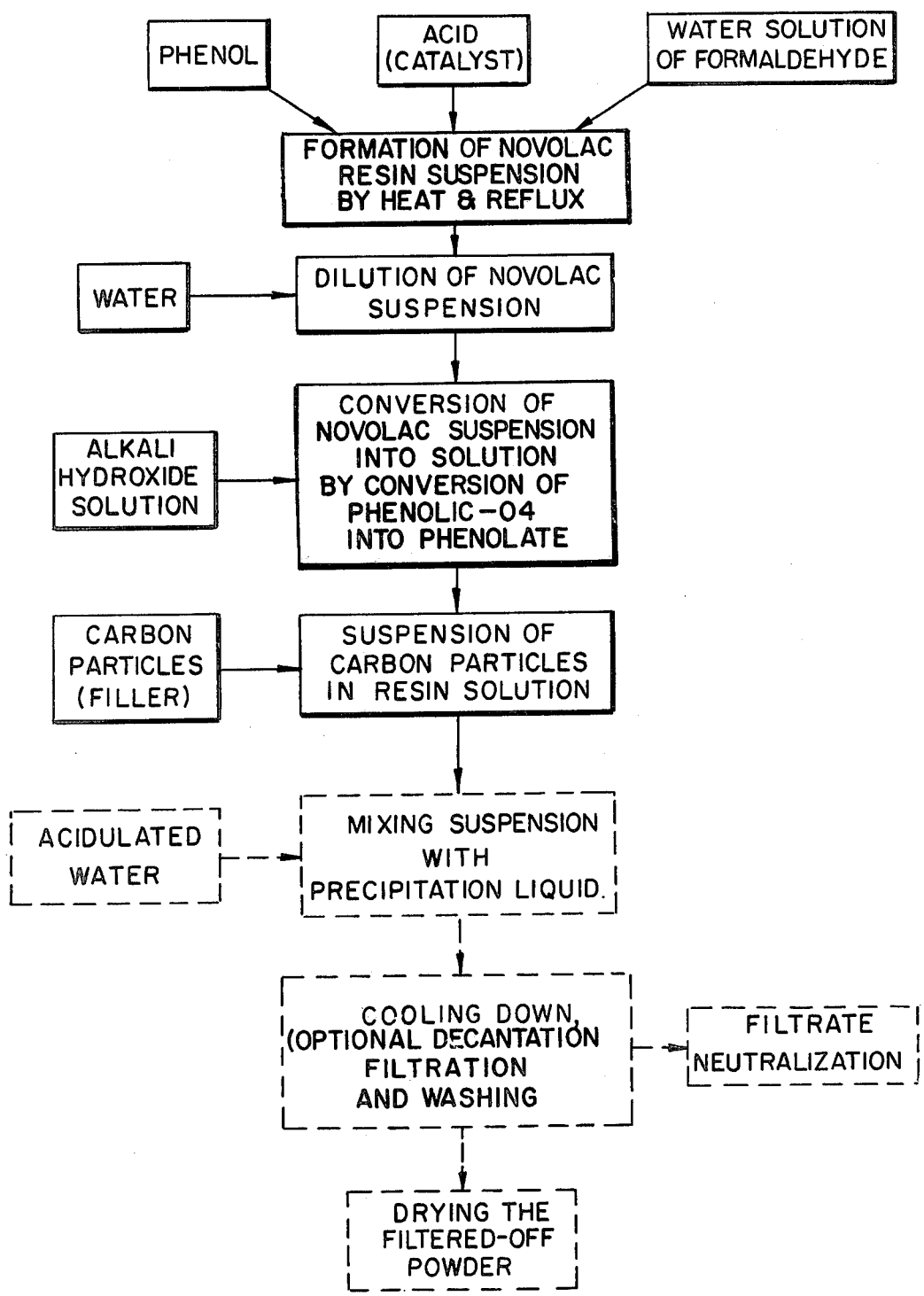

METHOD OF PRODUCING RESIN SOLUTION AND A SUSPENSION OF PARTICLES THEREIN FOR USE AS A STARTING MATERIAL FOR THE MANUFACTURE OF A COATED FILLER POWDER FOR MAKING MOLDS AND THE LIKE

This invention concerns a method of making a suspension of carbonaceous particles in an alkaline solution of phenolformaldehyde resin suitable for production of a composite molding powder for the making of artificial graphite or graphite-like materials and articles molded therefrom, particularly fine grain graphite materials and articles, according to the process of the co-pending U.S. patent application Ser. No. 886,419, filed Mar. 14, 1978 and U.S. Pat. No. 4,023,979, May 17, 1977. In particular, the present invention concerns a method for the preparation of the alkaline solution of phenolformaldehyde resin suitable for use in that process.

In the process disclosed in said co-pending patent application and patent, a mixture of materials providing body or filler to the product, such as ground coke, electrographite, natural graphite, carbon black or the like and a phenolformaldehyde resin binder in the form of a composite powder in which the particles of the body or filler material are coated with the phenolformaldehyde resin, is produced by suspending the particles of the filler or body material in a binder solution and then injecting a liquid serving to precipitate the binder into a mixing chamber by means of a mixing nozzle in such a way that the filler kernels or particles are uniformly coated with the binder, and then in the next process step separating the coated filler particles from the liquid and drying the separated mass.

THE PRESENT INVENTION

It is an object of this invention to overcome the disadvantages above mentioned in the previous methods of providing an alkaline phenolformaldehyde solution and suspending carbon particles therein and at the same time to simplify and make more economic the operation of the process for making the composite powder usuable for molding articles having properties like articles made of graphite.

To summarize the invention briefly, phenol is dissolved in a water solution of formaldehyde containing between 10 and 35% of formaldehyde by weight, the phenol being dissolved in an amount of between 45 and 60% by weight of the total weight of the phenol and the formaldehyde solution. An acid is added to the solution as a catalyst. The resulting mixture is then heated to its boiling point and refluxed, after which the solution is diluted with water. The phenolic OH groups of the resin are then converted to phenolates by adding an alkali hydroxide solution.

The dissolved phenolformaldehyde resin in this case is of the novolac type.

The alkaline solution of a novolac phenolformaldehyde resin thus prepared is then used to make a suspension, in accordance with process of the said co-pending patent so coated (forming a mud-like mass, by filtration or decantation) and finally drying the separated mass. In this process the kernels and particles of the filler or body material are suspended in the previously prepared alkaline solution of phenolformaldehyde resin and the suspension is mixed with acidulated water that is used as a precipitation liquid in order to coat the suspended particles evenly with binder.

A disadvantage of the above described process of the said co-pending application, as practiced before the present invention, is that the necessary use of solvents and likewise of alkaline solutions required a relatively high consumption of time. A further substantial disadvantage resulted that the binder properties of the novolac resin used exhibits differences which detract from any specification of desired results and, furthermore, have an undesirable effect on the artificial graphite and graphite-like materials produced by this process. It has been found that the resins used as the binder have different network characteristics even when they have the same chemical composition. Of course, homogenization within a single batch is possible, but it is still not possible to avoid differences from batch to batch. There is also the further disadvantage that when solid novolac resin is used as the binder, the resin changes with age as the result of storage temperature, storage time and light exposure.

Thereafter the rest of the steps of the process of the said co-pending patent application may be performed, namely the mixing with acidulated water in such a manner as to percipitate the resin evenly on the surfaces of the particles, separation of the particles, cooling the particles and separating them by filtration, with or without prior decantation and, and washing the mass and finally drying the particles, preferably at about 60° C. to obtain the desired product.

THE DRAWING

The invention is illustrated by the flow diagram which shows the process of the present invention set forth below in Example 1 immediately followed by the process of the aforesaid copending patent application.

As shown in the drawing, the preparation of the alkaline solution of a novolac phenolformaldehyde resin and the suspension of carbonaceous particles therein according to the present invention is followed immediately by the resin precipitation stage of the process of the co-pending application, in which acidulated water is mixed in such a way to precipitate the resin evenly on the surfaces of the particles after which the remaining steps of the process are carried out as above described.

When the process of the present invention is used to produce the suspension which is thereafter subjected to the following stages of the process of the said co-pending application, the composite molding powder then obtained, as the result of its homogeneity is usable to make molds and mold parts having properties of the finished material that are not subject to variation as the result of differences in the binder quality over short or long periods of production of the same output product with the same compounding formula. The molding powder made with the benefit of the process of the present invention and the mold parts produced therefrom have highly uniform material properties and are consequently advantageously used for the manufacture of metallic castings, glass parts and crucibles.

The economy of the process of the present invention is particularly good because it saves not only the time and expense of removing water from the freshly prepared novolac resin and then later redissolving the resin, but also the expense of transporting and storing the resin between the time of its preparation and the time of its use, because the solution prepared by the present invention is ready for immediate use in the process of making the composite powder from which molds can subsequently be manufactured for the foundry and the casting industry.

The invention is now further described by way of illustrative example.

EXAMPLE 1

1.5 kg of phenol were dissolved in 1.3 kg of water solution of formaldehyde having a 35% by weight formaldehyde content and the resulting solution then mixed with 150 g of concentrated hydrochloric acid and boiled with refluxing for about two hours. The hot novolac suspension thereby formed was diluted with about 6 liters of water and then converted into a resin solution by the addition of a water solution of sodium hydroxide of a concentration of 10% by weight in quantity sufficient to bring the solution to a pH value in the range from 10 to 13. 3.3 kg of electrographite having a grain size of $\leq 100$ μm were then stirred into the still hot solution, after which the suspension, at a temperature of 60° C. was fed into the liquid used for precipitation. The precipitation liquid consisted of 65 liters of water acidulated with about 250 g of concentrated hydrochloric acid and was at a temperature of about 50° C. when the suspension was fed in. Upon the mixing of the suspension with the precipitation liquid flows were so adjusted and maintained at the volume ratio of the precipitation liquid to the binder-filler suspension was about 8:1. After mixing and cooling the composite powder formed was filtered off, washed and dried. The filtrate was neutralized with sodium hydroxide. The composite powder obtained was of very fine grain and the grains were evenly coated with the binder.

EXAMPLE 2

1.5 kg of phenol were dissolved in 1.3 kg of formaldehyde solution of 35% by weight formaldehyde content. The resulting solution was mixed with 10 g of oxalic acid and boiled with refluxing for one hour. Thereafter 30 g of concentrated hydrochloric acid were added, and the solution was again boiled under refluxing for an hour. The hot novolac suspension thus obtained was then converted into a resin solution by the addition of a water solution of sodium hydroxide of 10% by weight concentration to bring the pH value to the range from 10 to 13. Then the solution was diluted with about 6 liters of water. 3.3 kg of an electrographite filler having a grain size of $\leq 100$ μm were stirred into the hot solution and the resulting suspension was fed, at a temperature of about 70° C., into the liquid serving for precipitation. The precipitation liquid consisted of 65 liters of water acidulated with about 250 g of concentrated hydrochloric acid and was at a temperature of about 50° C. when the suspension was first fed in. Upon the mixing of the suspension with the precipitation liquid, the liquid flows were so adjusted and maintained that the volume ratio of precipitation liquid to binder-filler suspension was about an 8:1. After the mixing, the composite powder produced was filtered off, washed and dried. The filtrate was neutralized with sodium hydroxide. The composite powder produced was very fine and had an even coating of the grains with the binder.

Although the invention has been described with reference to specific illustrative examples, it will be understood that variations and modifications are possible within the inventive concept. Thus, for example, any of the acids heretofore used as a catalyst to promote the combination of phenol and formaldehyde into a novolac resin may be used in the first step of the process and in the acidulated water used to precipitate the resin in the process of the copending application, instead of hydrochloric acid, another acid of comparable acidity can be used to acidulate the water. In general, mineral acids and low molecular weight acids are suitable.

The dilution of either novolac suspension or novolac solution can be done either before or after the adding of the alkaline solution.

Although in the illustrative examples the pH of the hot novolac solution brought into the range from 10 to 13, useful solutions for the practice of the invention with a pH as low as 8 or as high as 14 can also be made, although the range from 10 to 13 is preferred.

For alkaline conversion of the novolac suspension KOH and LiOH can be used, too.

Instead of phenol as it is used in examples 1 and 2 of course phenol derivates like cresole may be used. Instead of said water solution of formaldehyde a water solution of acetaldehyde may be used.

We claim:

1. In a method of producing a dispersion of starting materials, consisting of carbonaceous particles suspended in an alkaline solution of phenolformaldehyde resin, for the process of making a composite molding powder of coated particles for the manufacture therefrom of artificial graphite or graphite-like material or molded articles, comprising the steps of dissolving phenol in an aqueous solution of formaldehyde, said aqueous solution containing between 10 and 35% of formaldehyde by weight and the phenol being dissolved in an amount of between 45 and 60% by weight of the total weight of the phenol and the formaldehyde solution put together, and thereafter reacting the phenol and formaldehdye to produce a resin which is used to coat carbonaceous particles, the improvement which consists in that an acid if first added to the phenol and formaldehyde solution as a catalyst for promoting reaction between the phenol and formaldehyde after which the resulting mixture is heated to its boiling point and reflux-boiled;

thereafter the resin suspension thereby formed is considerably diluted with water;

the phenolic-OH groups of the resin are converted, after dilution of the suspension, to phenolates by adding an alkaline solution to the diluted resin suspension, thereby providing an alkaline phenolformaldehyde resin solution suitable for use in said powder-making process; and at a later stage in said powder-making process, there are added to said alkaline dilute phenolformaldehyde resin solution, particles of a material consisting essentially of carbon for subsequent precipitation of a solid resin coating thereon and said particles are suspended in said last-mentioned solution by mechanical agitation.

2. An improvement in a method as defined in claim 1, in which said particles are of a material selected from the group consisting of ground coke, electrographite, natural graphite, and carbon black.

3. An improvement in a method as defined in either claim 1 or claim 2, in which said acid is an acid selected from the group consisting of mineral acids and low molecular weight organic acids.

4. In a method of producing an alkaline-phenolformaldehyde resin solution suitable for use in the process of making a composite molding powder of coated particles for the manufacture therefrom of artificial graphite or graphite-like material or molded articles, comprising the steps of dissolving phenol in an aqueous solution of formaldehyde, said aqueous solution containing between 10 and 35% of formaldehdye by weight and the phenol being dissolved in an amount of between 45 and 60% by weight of the total weight of the phenol and the formaldehyde solution put together, and thereafter reacting these reagents to form a resin which is used to coat filler particles, the improvement which consists in that:

- an acid is first added to the phenol and formaldehyde solution as a catalyst for promoting reaction between the phenol and formaldehyde after which the resulting mixture is heated to its boiling point and reflux-boiled to produce a resin in water suspension;
- the phenolic —OH groups of the resin are then converted to phenolates by adding an alkaline solution to the resin suspension;
- thereafter the alkaline resin solution is considerably diluted with water, and
- at a later stage in said powder-making process, there are added to said alkaline dilute phenolformaldehyde resin solution, particles of a material consisting essentially of carbon and said particles are suspended in said last-mentioned solution by mechanical agitation.

5. An improvement in a method as defined in one of claims 1 or 4 in which the acid is an acid selected from the group consisting of mineral acids and low molecular weight organic acids.

6. An improvement in a method as defined in either claim 1 or claim 4 in which the mechanical agitation provided for suspending said particles in said alkaline phenolformaldehyde solution comprises stirring.

7. An improvement in a method as defined in either claims 1 or claim 4 in which the mechanical agitation provided for suspending said particles in said alkaline phenolformaldehyde solution comprises vibrating said solution.

8. An improvement in a method as defined in claim 4, in which said particles are of a material selected from the group consisting of ground coke, electrographite, natural graphite, and carbon black.

9. An improvement in a method as defined in either claim 4 or claim 8, in which said acid is an acid selected from the group consisting of mineral acids and low molecular weight organic acids.

* * * * *